May 12, 1931. J. C. DICKINSON 1,804,596
GAS METER
Filed March 7, 1928 5 Sheets-Sheet 1
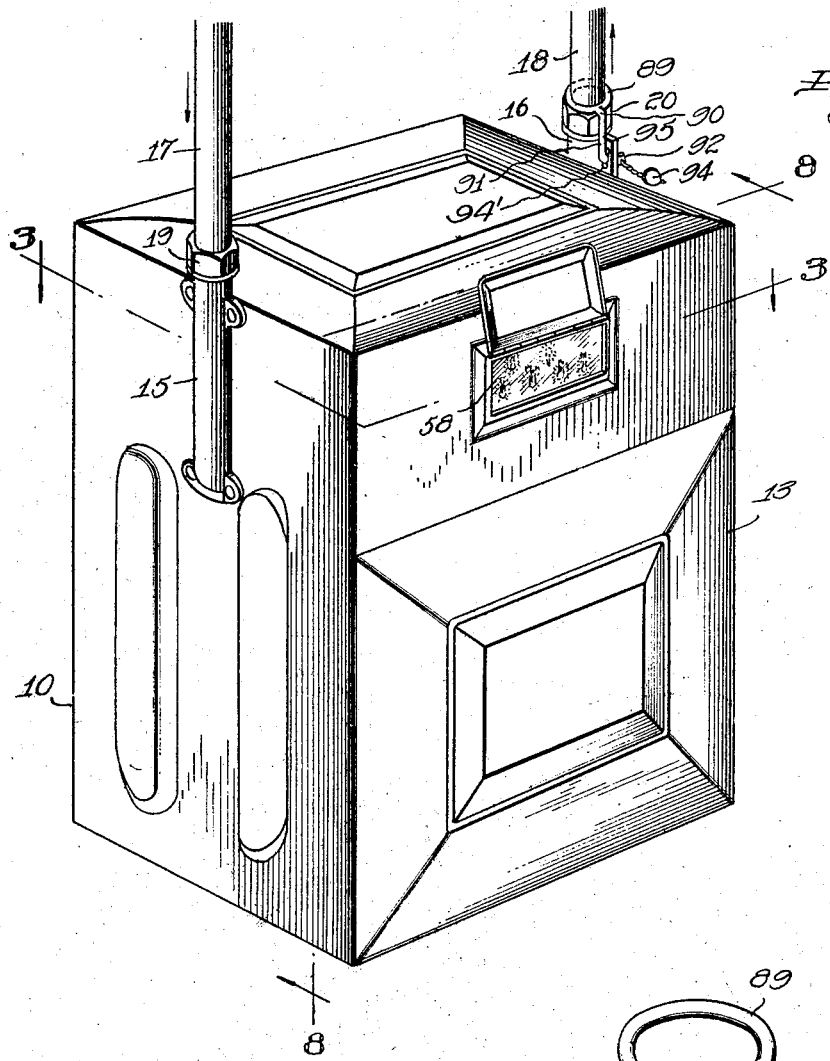
Inventor
JAMES C. DICKINSON
By  *Attorney*

May 12, 1931.  J. C. DICKINSON  1,804,596
GAS METER
Filed March 7, 1928   5 Sheets-Sheet 2
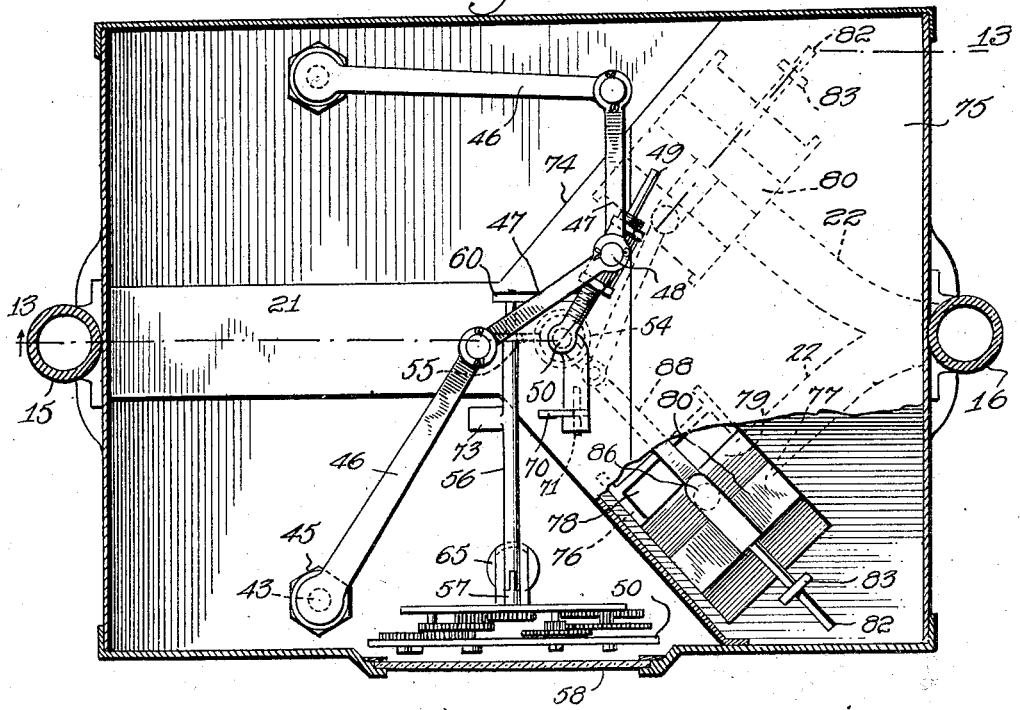
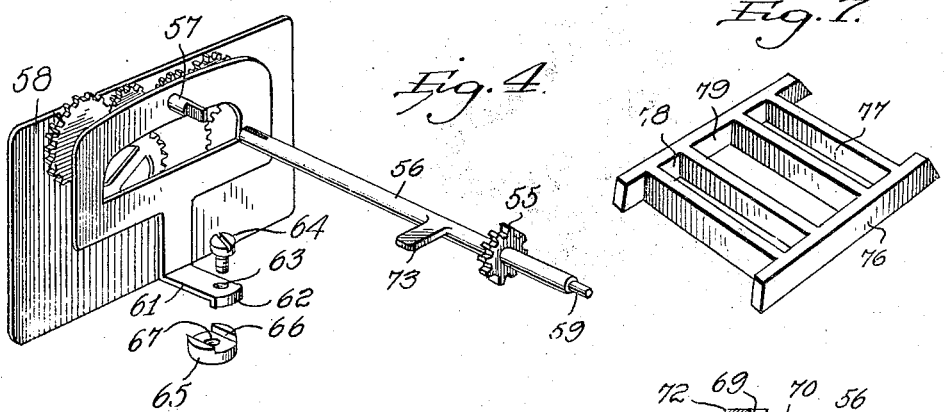
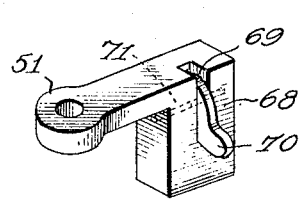
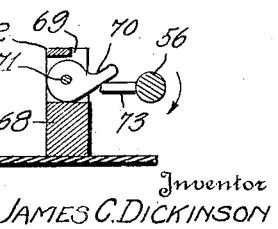
Inventor
JAMES C. DICKINSON
By
Attorney May 12, 1931. J. C. DICKINSON 1,804,596
GAS METER
Filed March 7, 1928 5 Sheets-Sheet 3

Inventor
JAMES C. DICKINSON
By
Attorney

May 12, 1931. J. C. DICKINSON 1,804,596
GAS METER
Filed March 7, 1928 5 Sheets-Sheet 4

Inventor
JAMES C. DICKINSON

By
Attorney

May 12, 1931. J. C. DICKINSON 1,804,596
GAS METER
Filed March 7, 1928 5 Sheets-Sheet 5

Inventor
JAMES C. DICKINSON
By
Attorney.

Patented May 12, 1931

1,804,596

UNITED STATES PATENT OFFICE

JAMES C. DICKINSON, OF ATLANTIC CITY, NEW JERSEY, ASSIGNOR OF TWENTY-SIX ONE-HUNDREDTHS TO CHESTER GREY AND TWENTY-SIX ONE-HUNDREDTHS TO ROBERT W. WIEDERWAX, BOTH OF ATLANTIC CITY, NEW JERSEY

GAS METER

Application filed March 7, 1928. Serial No. 259,829.

This invention relates to meters, and more particularly to gas meters.

An important object of the invention is to provide novel means for permitting the removal of the diaphragms to permit the repair and replacement thereof without damaging other parts of the meter.

A further object is to provide a meter of the above referred to character wherein a plurality of detachable securing means is provided for securing each diaphragm in position, one of such securing means comprising the conduit through which gas is introduced into and discharged from the diaphragm.

In the drawings I have shown one embodiment of the invention. In this showing,

Figure 1 is a perspective view of the meter showing the seal applied,

Figure 2 is an enlarged detail perspective view of the seal,

Figure 8:
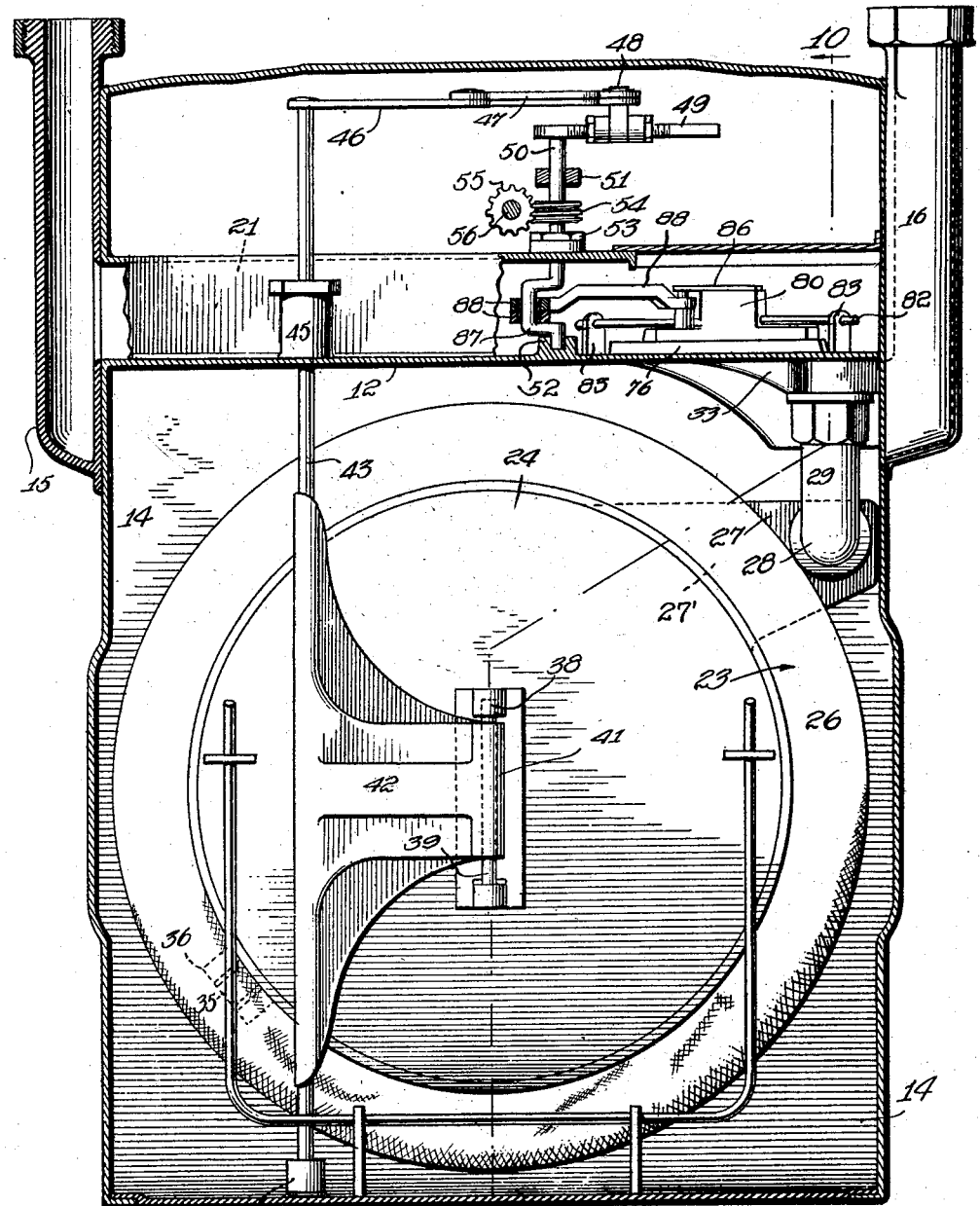
Figure 9:
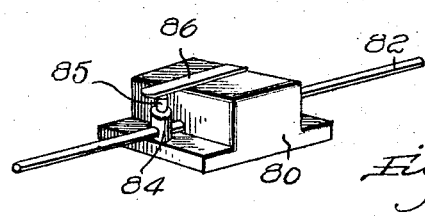
Figure 10:
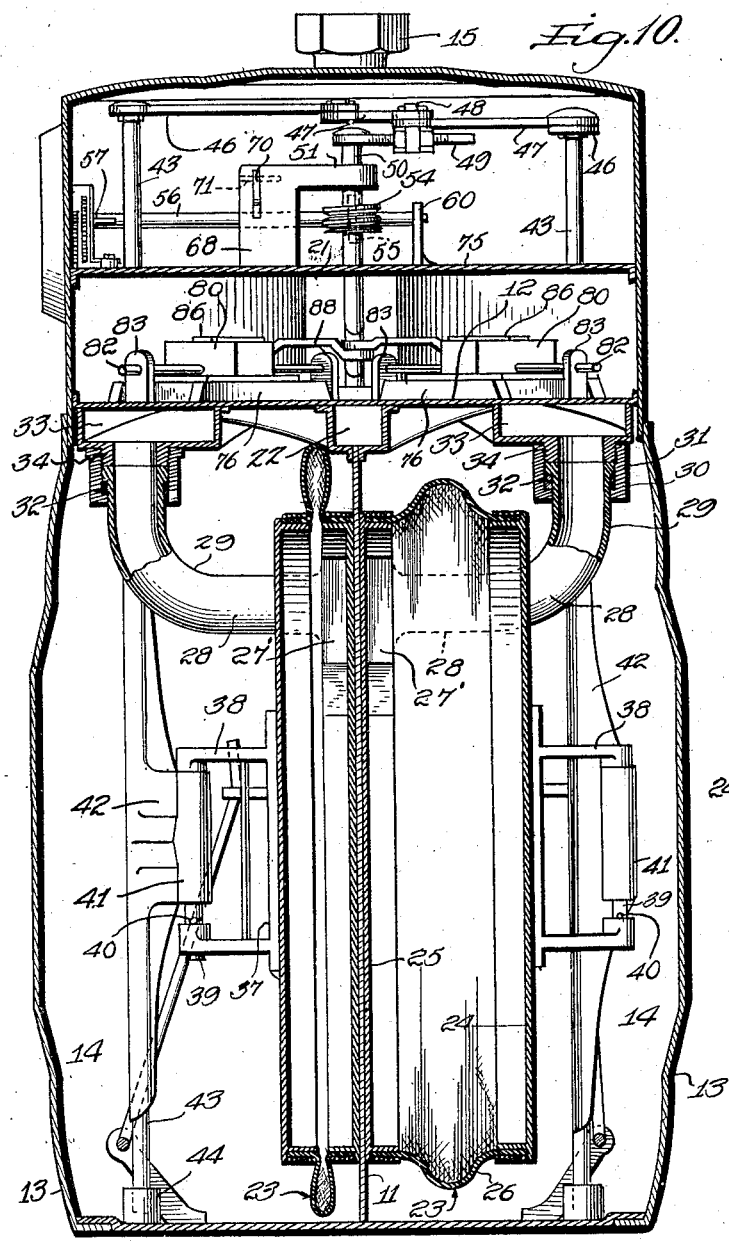
Figure 11:
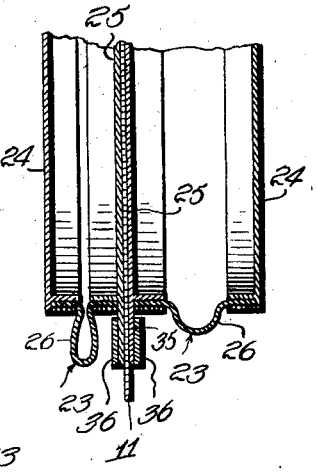
Figure 12:
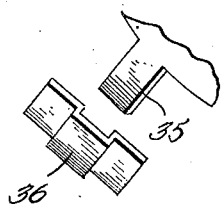
Figure 13:
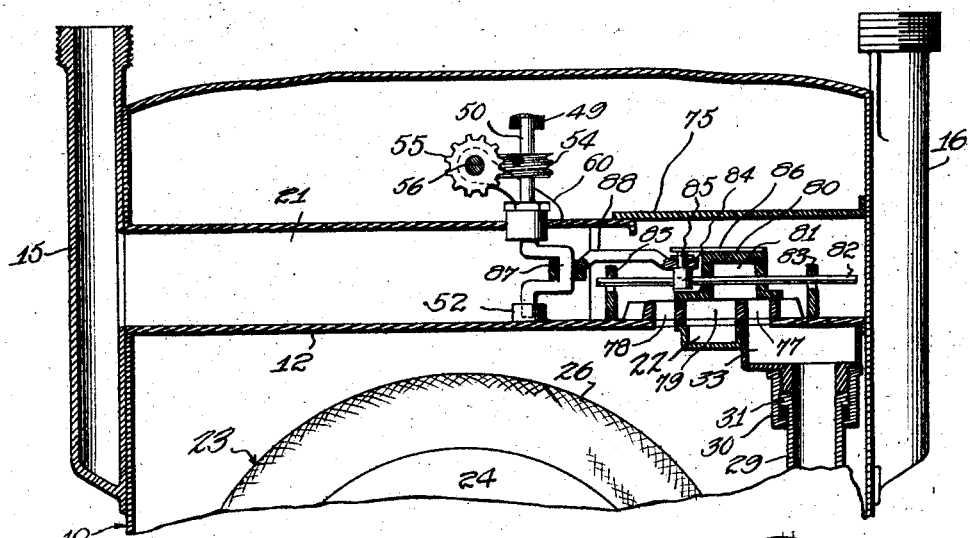
Figure 14:
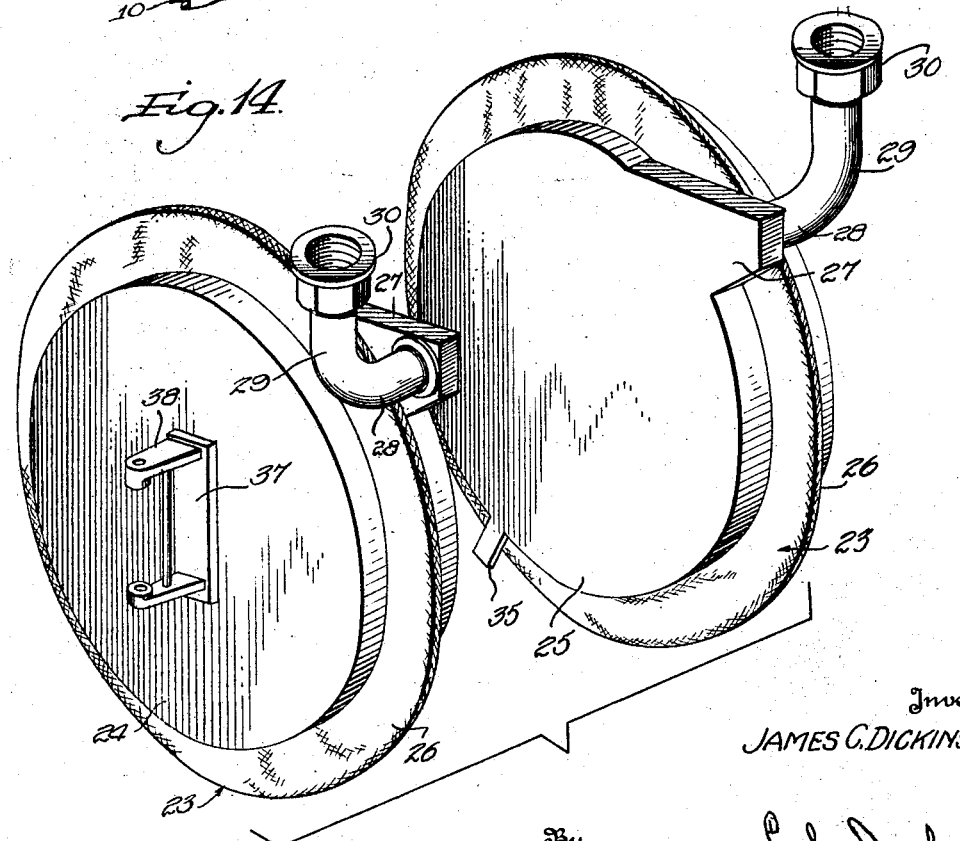

Figure 3 is a horizontal sectional view taken substantially on line 3—3 of Figure 1, Figure 4 is a detail perspective of the index and associated elements, Figure 5 is a detail perspective of a portion of the means for permitting back pressure to reverse the meter a predetermined number of revolutions of the crank post, Figure 6 is a detail sectional view of the same showing its association with the operating means therefor, Figure 7 is a detail perspective of the valve seat, Figure 8 is a section taken substantially on line 8—8 of Figure 1, parts being shown in section, Figure 9 is a detail perspective view of the valve showing the means for detachably connecting the valve arm thereto, Figure 10 is a section taken substantially on line 10—10 of Figure 8, Figure 11 is a fragmentary detail sectional view of a portion of the diaphragms and mounting means therefor, Figure 12 is a fragmentary perspective view showing one of the attaching devices for the diaphragms, Figure 13 is a fragmentary vertical sectional view on line 13—13 of Figure 3, and, Figure 14 is an enlarged perspective view of the diaphragms and associated elements.

Referring to the drawings, the numeral 10 designates the usual casing having a vertical partition 11 therein secured at its upper end to the usual table top 12, forming a partition between the upper and lower portions of the meter. The casing is provided with the usual cover plates 13 to provide access to the diaphragm chambers 14. Inlet and outlet conduits 15 and 16 respectively are carried by the casing and are adapted to be connected to inlet pipes 17 and 18 by suitable unions 19 and 20. An inlet conduit 21 supplies gas to the interior of the meter, while the gas flows to the outlet conduit 16 through passages 22.

A diaphragm indicated as a whole by the numeral 23 is arranged in each of the diaphragm chambers 14. Each diaphragm includes outer and inner metallic disks 24 and 25, the latter being arranged against the partition 11, as shown in Figure 10. The inner and outer disks of each diaphragm are connected by the usual flexible element 26 to form in effect a bellows adapted to be expanded and contracted in the usual manner.

Each disk 25 is provided with a radial extension 27 through which a port or passageway 27' extends. One end of the port 27' communicates with the interior of the diaphragm, while the other end of the port communicates with one end of a pipe 28, the outer end of this pipe being turned upwardly as at 29 and provided with a union 30. The top of each pipe 29 is flanged as at 31, and packing 32 may be arranged in each union 30 beneath the flange 31. A gas conduit 33 is arranged above each of the pipes 28 and is provided with a central depending threaded portion 34 which is adapted to be engaged by the union 30.

It will be apparent that the pipe 28 forms securing means for one side of each diaphragm, and means also is provided for securing the opposite side of each diaphragm to the partition 11 to permit it to be removed without injury to the other elements of the meter. In this connection, attention is invited to the fact that it is the usual practice to solder the disks 25 to the partition 11, and these disks can be removed only with difficulty, and usually only by injuring the partition or some portion of the diaphragm. Substantially diametrically opposite each port 27', a lip 35 extends outwardly from the associated disk 25, preferably radially thereof. This lip is arranged in the same plane as the disk 25 and is adapted to be received in a socket 36, preferably formed of sheet metal and secured to the partition 11. It will be apparent that when the unions 30 are disconnected, the adjacent portions of the diaphragms may be swung upwardly and outwardly to disconnect the lips 35 from their associated sockets whereby the diaphragms may be quickly removed without injury to any of the parts of the meter.

Each disk 24 is provided with a plate 37 secured thereto and provided with outstanding bearing arms 38 adapted to receive a pin 39, as shown in Figures 8 and 10. Each pin 39 extends through alined openings formed in the bearing arms and is supported against downward movement by a pin 40. Each bearing 41 of flags 42 receives one of the pins 39 whereby the flags are connected to the diaphragms for pivoted movement with respect thereto. The outer end of each flag is secured to a vertical rod or shaft 43 journalled in bearings 44 mounted against the bottom of the meter casing. The upper ends of the flag rods 43 extend through stuffing boxes 45 in the usual manner.

The upper end of each rod 43 is secured to a crank or flag arm 46, as shown in Figures 3 and 8, and the free end of each arm 46 is pivotally connected to one end of a link 47. The free ends of these links are pivotally connected in the usual manner to a crank pin 48 carried by an arm 49 mounted on the upper end of a crank post 50. The upper and lower ends of the crank post are journalled in bearings 51 and 52 respectively and the crank post passes through a stuffing box 53 mounted in the top of the conduit 21.

The crank post is rotated in the usual manner upon the alternate expansion and contraction of the diaphragms, and movement of the crank post is transmitted through a worm 54 and worm wheel 55 to an index shaft 56 as shown in Figures 4, 8 and 13. The outer end of the shaft 56 is adapted for connection with the drive shaft 57 of the usual index 58. The inner extremity of the shaft 56 is preferably reduced as at 59 and is mounted for rotation in a bearing 60. It is the usual practice to secure the index to the table top 12 by soldering it thereto, and the index must be so positioned as not to cause any binding action on the shaft 56 which would interfere with the accurate operation of the meter. With the usual constructions, when it becomes necessary to remove the index for any purpose such as repairing or replacement, the index is replaced or a new one placed in position in the same manner, and it is difficult to place the device in the proper position referred to whereby no binding action will be transmitted to the shaft 56. An additional difficulty usually is encountered by virtue of the fact that certain of the gas conduits are soldered against the table top 12, and when the index is resoldered in position, the soldered connections of the conduits referred to are sometimes damaged, thus causing leakage.

Means are provided in the present construction for permitting the accurate replacement of a repaired index without the necessity for soldering the bottom of the index to the table top. Referring to Figure 4, the numeral 61 designates a horizontal projection preferably formed integral with the back plate of the index and extending horizontally therefrom. The extremity of the arm or extension 61 is turned downwardly as at 62 and is curved for a purpose to be described. The arm 61 is provided with an aperture 63 in which a screw 64 is adapted to be arranged. The arm 61 is adapted to be mounted upon a securing element 65. This element is preferably soldered against the table top and is provided with a groove 66 in its upper face to receive the arm 61, the downturned end 62 of the latter being arranged against the sides of the member 65. The screw 64 is adapted to pass downwardly for engagement within a threaded opening 67 formed in the member 65. It will be apparent that once the member 65 has been soldered in position, the index readily may be removed without disturbing this member and may be replaced accurately in position merely by removing and replacing the screw 65, without the use of soldering irons.

The shaft 56 normally operates in a given direction in performing its desired functions. It occasionally happens that when all of the outlets from the meter are closed and a temperature of the gas beyond the outlet side of the meter increases, the gas expands and causes a back pressure in the meter whereby the parts of the latter are caused to operate in reverse directions. It has been proposed to provide locking means which will permit the reverse action to take place to some extent, but such means usually is impractical for the reason that it sometimes will permit only a single reverse rotation of the crank post. In the present construction, means is provided for permitting at least three reverse rotations of the crank post and as many as nine or ten reverse revolutions, depending upon the structural elements of the meter to which the device is connected. The upper bearing 51 of the crank post is formed integral with a block 68 mounted on the top of the inlet conduit 21. The block 68 is vertically slotted as at 69 to receive a finger 70 which is pivoted to the block 68 as at 71. A transverse member 72 preferably formed integral with the block 68, is adapted to limit the turning movement of the finger 70. An outstanding lug or similar projection 73 is carried by the shaft 56, and the finger 70 is arranged in the path of travel of this lug. Under normal conditions, the shaft 56 rotates in the direction indicated by the arrow in Figure 6 whereby it will be apparent that the finger escapes over the lug 73 upon each successive rotation of the shaft 56. In this connection, it will be noted that the speed of rotation of the shaft 56 is greatly reduced with respect to that of the crank post 50 owing to the worm 54 and worm wheel 55 employed as the transmission means between the two shafts. With the parts in the position shown in Figure 6, it will be apparent that more than a complete revolution of the shaft 56 may take place in a reverse direction, thus permitting a number of reverse revolutions of the crank post 50, depending upon the pitch of the worm 54 and the number of teeth in the worm wheel 55.

The end of the conduit 21 adjacent the crank post 50 flares outwardly as at 74 to form a chamber 75 in which are arranged the usual control valves for the diaphragm, and operating elements therefor. A pair of valve seats 76 is arranged in the chamber 75 in the usual manner, each seat including an outer port 77 communicating with the conduit 33 leading to the diaphragms through pipes 28. Each valve seat further includes an inner port 78 leading directly to one of the diaphragm chambers 14, and a supplemental port 79 communicating with the gas outlet conduits 22.

A valve 80 is mounted to slide over each valve seat in the usual manner and is provided with a pocket 81 adapted to alternately afford communication between the central port 79 of the valve seat and one of the ports 77 and 78. The valve is provided with a pin 82 extending on opposite sides thereof and slidable in guides 83. Each pin 82 is provided to one side of the associated valve with an upstanding post 84 having a reduced vertical extension 85 at its upper end. A spring 86 is soldered or otherwise secured against the top of the valve and has one end extending above the projection 85, as shown in Figures 9 and 13. The crank post 50 is provided with a crank 87 to which the inner ends of a pair of links 88 are pivotally connected. The outer ends of these links are apertured as shown in Figure 13 to receive the vertical projections 85. It will be apparent that the outer ends of the links are adapted to be maintained in operative engagement with the projections 85 by means of the springs 86, and that the latter may be flexed upwardly to permit removal of the links 88 from the valves when it is desired to clean or grind the valves and seats, or to perform any other work thereon.

In Figures 1 and 2 of the drawings I have shown novel means for sealing the outlet pipe 18 against unauthorized removal, such sealing means permitting tightening of the union 20 when leakage occurs around the packing therein. Referring to Figures 1 and 2, the numeral 89 designates a ring of relatively stiff material surrounding the lower end of the outlet pipe 18 adjacent the union 20. The ring 89 is closed and is provided with a radial extension 90 terminating in a depending arm 91. The lower end of this arm is preferably flattened and extended transversely as at 92, and is provided with an opening 93 to receive the wire of a seal 94. The projection 92 is received in an opening 94' formed in a lateral extension 95 carried by the outlet conduit 16. It will be apparent that the ring 89 limits upward movement of the union 20 so as to prevent its removal, but permits the union to be turned downwardly whenever necessary to stop leakage around the packing of the union. This latter result usually is accomplished only by removing the types of seals commonly employed.

The operation of the meter is as follows:

So far as the general operation of the meter as a whole is concerned, it is believed that it need not be referred to in detail inasmuch as the parts of the meter function substantially in the usual manner. The diaphragms are alternately expanded and contracted in the usual manner, gas passing into the diaphragms through the valve ports 77, passage 33 and pipes 28, when the valve seat ports 77 are uncovered. Gas passes from the diaphragms through the same valve seat ports, when the latter are covered by the valves, the gas passing through the outlet conduit through the ports 79 and conduits 22. The same action takes place with respect to the gas in the diaphragm chambers 14, except that the gas passes through the valve seat ports 78, as will be understood.

As previously stated, it is the usual practice to solder the inner disks of the diaphragms to the partition 11, thus rendering the removal of the diaphragms extremely difficult without causing damage to the parts. In the present construction, the inner diaphragm disks seat against the partition 11 but are not secured thereto. The pipes 28 and their connections with the conduit 33 serve to anchor one side of each diaphragm in position, while the opposite sides thereof are held by the engagement of the tongues 35 in the sockets 36. When it is necessary or desirable to remove either diaphragm, the pin 40 thereof is removed, and the diaphragm is flexed until the upper end of the shaft 39 is freed from the upper bracket 38. The upper end of the pin 39 is then swung outwardly, whereupon it may be drawn upwardly to force it from the lower bracket 38. The corresponding union 30 is then unscrewed and permitted to slide downwardly about the vertical portion 29 of the pipe 28. The adjacent portion of the diaphragm is then moved upwardly and outwardly until the tongue 35 is released from the socket 36 and the diaphragm is then ready to be completely removed from the meter for repairs, replacement or other purposes. The diaphragm readily may be replaced, or a new one placed in position, by reversing the operations just referred to.

Movement of the diaphragm is transmitted through the flag shafts 43 to the flag arms 46, the oscillating movement of these arms being translated into rotary movement of the crank post 50 through the link connections 47 and associated elements. Rotation of the crank 87 obviously effects reciprocation of the valves 80 in the usual manner, the valves being guided in their movement by the arrangement of the rods 82 in the guides 83. The free ends of the arms 88 are maintained in operative position by the springs 86 and readily may be removed from engagement with the valves by flexing the free ends of the springs 86 upwardly. The use of the springs eliminates the use of separate cotter pins or similar fastening elements with the arms 88, thus facilitating the work of removing and replacing the valves.

Owing to changes in temperature conditions, expansion and contraction of the gas discharged from the meter takes place, but has no effect on the operating parts of the meter while any gas burners connected thereto are open. However, when none of the burners is in operation expansion of the gas causes the meter to reverse. In order to prevent unauthorized persons from tampering with a meter by reversing the inlet and outlet connections thereto, practically all meters are provided with means to prevent the operation of the meter under such conditions to prevent the consumption of gas. At the same time, it is desirable for such means to be of such a nature as to permit the meter to reverse its operation for a relatively short time to compensate for expansion of the gas in the outlet lines under the conditions referred to. The means provided for this purpose usually permit only one or two reverse rotations of the crank post whereupon further reverse rotation is prevented. If the expansion of the gas takes place to any considerable extent, the failure of the means referred to to compensate for such gas expansion results in damage to the meter.

In the present construction, novel means is employed for permitting a relatively large number of reverse rotations of the crank post to prevent injury to the meter. It will be noted that the projection 73 is carried by the index shaft 56 which rotates at a very slow speed with respect to the rotation of the crank post. The pivoted member 70 is mounted with the finger portion thereof arranged in the path of rotation of the lip 73, the finger escaping over the lip at each successive rotation of the crank post in the direction of the arrow in Figure 6. It will be apparent that the finger is arranged a substantial distance above the bottom of the slot 69 at each successive escapement, and if the expansion of the gas in the outlet lines should take place immediately after the finger escapes over the lip 73, the crank post is permitted to partake of at least three reverse rotations before the finger engages the bottom of the slot 69 to prevent further reverse rotation. The number of minimum turns of the crank post permitted in a reverse direction may be increased merely by lengthening the lip 73 and finger 70. If the reverse rotation should start just prior to the escapement of the finger 70 over the lip 73, more than a complete revolution of the shaft 56 in a reverse direction is permitted. In the present construction, the worm wheel 55 is provided with twelve teeth and under the conditions set forth the crank post will be permitted to partake of approximately fifteen reverse rotations before further reverse movement thereof will be prevented. This number of maximum reverse rotations is greater in meters employing worm wheels having more than twelve teeth, as will be obvious. Thus it will be apparent that ample reverse movement of the working parts of the meter is provided to compensate for the greatest expansion which may take place, thus preventing any injury to the meter.

The legs of the index ordinarily are soldered in position, and after the removal thereof by unsoldering the connections, it is difficult and time consuming to replace the index in position in such a manner as to prevent any binding of the shaft 56 which often occurs. The removal and replacement of the index also presents the additional difficulty that the soldered connections of the gas conduits beneath the table top 12 are often damaged due to the application of heat to the table top. In the present construction, the member 65 is attached to the arm 61 by the screw 64 prior to the connection of the index to the table top. The index is placed in position in the meter and is moved to the proper position with respect to the shaft 56, whereupon the attaching member 65 is soldered to the table top. When it becomes necessary to remove the index for any reason, it merely is necessary to loosen the screw 64. Conversely, the index may be replaced by again tightening the screw 64 in position. The attaching member 65 is left in fixed position, and obviously prevents the incorrect replacement of the index. The reception of the arm 61 in the slot 66, and the securing of the arm to the attaching member prevents movement of the index in all directions, the index being rigidly secured in operative position. The construction defined also permits the removal and replacement of the index without the application of heat, and thus damage to the conduits beneath the table top, and the consequent leakage of gas, is prevented.

The usual sealing devices employed for preventing unauthorized removal of the outlet pipe 18 are of such nature as to prevent the tightening of the union 20 as the packing therein becomes compressed so as to permit leakage of the gas. In the present construction, a relatively rigid sealing device is employed, the ring of which relatively loosely surrounds the pipe 18 while the arm 91 is arranged a sufficient distance outwardly of the union to permit rotation thereof. The transverse arm 92 extends through the opening 94' which is slightly elongated vertically to permit limited vertical movement of the sealing device. As the packing in the union becomes compressed, a wrench readily may be applied to the union to tighten it and thus prevent leakage. On the other hand, the seal permits only limited upward movement of the union 20 and the latter cannot be unscrewed a sufficient distance to detach it from the conduit 16 without destroying the seal. Thus it will be apparent that unauthorized detachment of the outlet pipe is prevented, but an authorized person readily may tighten the union to prevent leakage without the loss of time usually incident to the destruction of the seal and the placing of a new seal in position.

As in the case of any other form of mechanism, the parts of a gas meter are subject to derangements, thus requiring repairs and replacements. The annual expenses of a gas company for caring for meters is very large due to the time required by mechanics to make the necessary adjustments, etc. The devices previously described are intended to function largely in the same manner as the corresponding parts of standard gas meters, but permit the necessary adjustments and repairs to be made in a fraction of the time usually required, thus materially reducing the upkeep expense of the meters.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. In a gas meter, a diaphragm support, a diaphragm including a circular disk arranged adjacent said support, said diaphragm being provided with a gas port, a pipe rigidly connected to said disk and communicating at one end with said port, means to which the opposite end of said pipe is detachably connected and constituting an inlet and outlet conduit therefor, a socket radially disposed with respect to said disk and carried by said support remote from said pipe, and a radial projection carried by said disk and slidably fitting in said socket.

2. In a gas meter, a diaphragm support, a diaphragm including inner and outer circular disks and a flexible element arranged therebetween, said inner disk having a radial extension provided with a gas port, a pipe rigidly connected at the outer end of said extension and communicating at one end with said port, means to which the opposite end of said pipe is detachably connected and constituting an inlet and outlet conduit therefor, a socket radially disposed with respect to said inner disk and carried by said support remote from said pipe, and a radial projection carried by said inner disk and slidably fitting in said socket.

3. In a gas meter, a diaphragm support, a diaphragm including inner and outer disks and a flexible element arranged therebetween, said diaphragm being provided with a gas port, a pipe rigidly connected to said inner disk and communicating at one end with said port, means to which the opposite end of said pipe is detachably connected and constituting an inlet and outlet conduit therefor, a socket carried by said support remote from said pipe, a projection carried by said inner disk and slidable in said socket, a pair of vertical spaced bearing arms carried by and projecting from said outer disk, a flag arm, and means for connecting said flag arm to said bearing arms, said means including a vertically movable member adapted in one position to connect said flag arm to said bearing arms and in another position to permit said flag arm to be detached from said bearing arms, said member being provided with detachable means normally holding it in said first named position.

4. In a gas meter, a diaphragm suport, a diaphragm including inner and outer circular disks and a flexible element arranged therebetween, said inner disk having a radial extension provided with a gas port, a pipe rigidly connected at the outer end of said extension and communicating at one end with said port, means to which the opposite end of said pipe is detachably connected and constituting an inlet and outlet conduit therefor, a socket radially disposed with respect to said inner disk and carried by said support remote from said pipe, a radial projection carried by said inner disk and slidably fitting in said socket, a pair of spaced bearing arms carried by said outer disk and projecting therefrom, a flag arm, means for detachably connecting said flag arm to said bearing arms, said means including a member movable to one position to normally connect said flag arm to said bearing arms and to another position to permit said flag arm to be disconnected from said bearing arms, and means for normally holding said member in said first named position.

In testimony whereof I affix my signature.

JAMES C. DICKINSON.